United States Patent
Geraci et al.

(10) Patent No.: US 10,963,738 B2
(45) Date of Patent: Mar. 30, 2021

(54) METHOD FOR PROCESSING INPUT ON BASIS OF NEURAL NETWORK LEARNING AND APPARATUS THEREFOR

(71) Applicant: Samsung Electronics Co., Ltd., Suwon-si (KR)

(72) Inventors: James Russell Geraci, Seoul (KR); Parichay Kapoor, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 16/338,579

(22) PCT Filed: Oct. 20, 2017

(86) PCT No.: PCT/KR2017/011638
§ 371 (c)(1),
(2) Date: Apr. 1, 2019

(87) PCT Pub. No.: WO2018/084473
PCT Pub. Date: May 11, 2018

(65) Prior Publication Data
US 2019/0251396 A1    Aug. 15, 2019

(30) Foreign Application Priority Data

Nov. 7, 2016 (KR) ............... 10-2016-0147735
Mar. 7, 2017 (KR) ............... 10-2017-0028899

(51) Int. Cl.
*G06K 9/00* (2006.01)
*G06K 9/62* (2006.01)
*G06N 3/08* (2006.01)
*G06N 3/04* (2006.01)
*G06K 9/46* (2006.01)

(52) U.S. Cl.
CPC ........ *G06K 9/6256* (2013.01); *G06K 9/4628* (2013.01); *G06K 9/6267* (2013.01); *G06K 9/6273* (2013.01); *G06N 3/04* (2013.01); *G06N 3/08* (2013.01); *G06K 9/00791* (2013.01)

(58) Field of Classification Search
CPC ................. G06N 3/02–105; G06K 9/00–82
See application file for complete search history.

(56) References Cited

U.S. PATENT DOCUMENTS

| | | |
|---|---|---|
| 7,804,974 B2 | 9/2010 | Paludan-Muller et al. |
| 9,977,997 B2 | 5/2018 | Bai et al. |
| 2006/0204025 A1 | 9/2006 | Paludan-Muller et al. |
| 2016/0019459 A1 | 1/2016 | Audnkhasi et al. |
| 2017/0220904 A1 | 8/2017 | Bai et al. |

(Continued)

FOREIGN PATENT DOCUMENTS

| | | |
|---|---|---|
| JP | 2006-031440 A | 2/2006 |
| JP | 2006-140952 A | 6/2006 |

(Continued)

*Primary Examiner* — Sean T Motsinger
(74) *Attorney, Agent, or Firm* — Jefferson IP Law, LLP

(57) ABSTRACT

An electronic device is provided. The electronic device includes a memory storing parameter sets, each of which includes one weight and bias sets respectively corresponding to n (where, n>1) occlusion levels among a plurality of occlusion levels within a certain range and at least one processor configured to obtain output data by inputting input data to a neural network.

15 Claims, 12 Drawing Sheets

(56) References Cited

U.S. PATENT DOCUMENTS

| | | | |
|---|---|---|---|
| 2018/0225552 A1 | 8/2018 | Bai et al. | |
| 2018/0349759 A1* | 12/2018 | Isogawa | G06N 3/0454 |
| 2019/0080149 A1* | 3/2019 | Gernoth | G06K 9/00281 |
| 2019/0104940 A1* | 4/2019 | Zhou | G06T 11/008 |
| 2019/0114742 A1* | 4/2019 | Wang | G06T 5/002 |
| 2019/0251396 A1* | 8/2019 | Geraci | G06K 9/4628 |
| 2020/0372612 A1* | 11/2020 | Higaki | G06T 5/002 |

FOREIGN PATENT DOCUMENTS

| | | | |
|---|---|---|---|
| JP | 2006140952 A | * | 6/2006 |
| JP | 2007-512717 A | | 5/2007 |
| WO | 2016/141282 A1 | | 9/2016 |
| WO | 2016/155564 A1 | | 10/2016 |

* cited by examiner

METHOD FOR PROCESSING INPUT ON BASIS OF NEURAL NETWORK LEARNING AND APPARATUS THEREFOR

TECHNICAL FIELD

The disclosure relates to an artificial intelligence (AI) system for simulating functions, such as the recognition and determination of the human brain, using a machine learning algorithm, such as deep learning, and an application thereof. Specifically, the disclosure relates to technologies of processing images using the training result obtained based on neural network training.

BACKGROUND ART

An artificial neural network is a statistical learning algorithm of obtaining a neuron structure of an animal nervous system based on a mathematical expression. The artificial neural network indicates the overall model in which artificial neurons establishing networks with combinations of synapses change the combination intensity of the synapses through training and have problem solution capabilities.

An AI system is a computer system for implementing a human level of intelligence. Unlike an existing rule-based smart system, the AI system is a system, a machine of which performs training and decision by itself and becomes smart. A recognition rate may be enhanced and user tastes may be more accurately understood, as it is used. Thus, the existing rule-based smart system has been replaced with a deep learning based AI system gradually.

AI technology is configured with machine learning and element technologies using the machine learning. The machine learning is algorithm technologies of classifying/learning characteristics of input data by itself. The element technologies are technologies which simulate functions, such as recognition, decision, and the like of the human brain, using a machine learning algorithm, such as deep learning. The element technologies are configured with technical fields, for example, language understanding, visual understanding, inference/prediction, knowledge expression, and operation control.

There are the following various fields in which the AI technology is applied. The language understanding is technologies of recognizing and applying/processing languages/characters of humans and includes natural language processing, machine translation, dialogue system, question and answer, speech recognition/synthesis, and the like. The visual understanding is technologies of recognizing and processing objects like human vision and includes object recognition, object tracking, image retrieval, person recognition, scene understanding, space understanding, image enhancement, and the like. The inference/prediction is technologies of determining information to logically infer and predict the determined information and includes knowledge/probability-based inference, optimization prediction, preference-based plans, recommendation, and the like. The knowledge expression is technologies of automating human experience information as knowledge data and includes knowledge building (data generation/classification), knowledge management (data application), and the like. The operation control is technologies of controlling autonomous driving of vehicles and the motion of robots and includes movement control (navigation, collision, and driving), manipulation control (behavior control), and the like.

Recently, a convolutional neural network (CNN)-based deep learning algorithm has shown impressive performance in fields, such as computer vision and speech recognition. A CNN, which is a kind of forward-reverse artificial neural network, has been studied actively in a variety of image processing of extracting abstracted information. An electronic device may recognize features by dividing an input image into small regions based on the CNN and may recognize the entire image by combining images divided while a neural network step is performed.

DISCLOSURE

Technical Problem

In image processing using an existing CNN algorithm, an input image is not always provided clearly. For example, the input image may include any degree of noise. The existing CNN algorithm may use previously learned parameters irrespective of noise.

The capacity of parameters using the existing CNN algorithm causes a load of the system under a limited environment although a noise level is considered. For example, when the capacity of a parameter stored for one specific noise level is 256 Mb and when the noise level is step 20, a memory of greater than 5 G is required to perform the existing CNN algorithm. That is, it is not efficient to use the existing CNN algorithm to process an input image under the limited system environment. In addition, in a situation where real time in image processing is required, for example, when a system of an autonomous system wants to recognize various signs or objects in inclement weather, such as rain or snow and fog, it is unsuitable for the existing CNN algorithm.

Various embodiments disclosed in the disclosure address the above-mentioned problems of the existing CNN algorithm and provide a new CNN algorithm capable of ensuring real time under the limited system environment.

Technical Solution

In accordance with an aspect of the disclosure, an electronic device is provided. The electronic device may include a memory storing a plurality of parameter sets, each of which includes one weight and bias sets respectively corresponding to n (where, n>1) occlusion levels among a plurality of occlusion levels within a certain range and at least one processor configured to obtain output data by inputting input data to a neural network. The at least one processor may be configured to obtain an occlusion value and determine a specific parameter set among the plurality of parameter sets based on the occlusion value, determine a specific bias set in the specific parameter set based on the occlusion value, and obtain the output data using a weight corresponding to the specific parameter set and the specific bias set.

In accordance with another aspect of the disclosure, an electronic device is provided. The electronic device may include a memory storing a first parameter set and a second parameter set, each of which includes one weight and bias values respectively corresponding to n (where, n>1) occlusion levels among a plurality of occlusion levels within a certain range and at least one processor configured to obtain output data by inputting input data to a neural network. The at least one processor may be configured to obtain an occlusion value and determine a parameter set to be applied to the neural network as the first parameter set based on the occlusion value, determine a specific bias value in the first parameter set based on the occlusion value, and obtain the output data using a weight corresponding to the first parameter set and the specific bias value.

In accordance with another aspect of the disclosure, a storage medium is provided. The storage medium may store instructions to obtain an occlusion value, determine a weight to be applied to a neural network operation based on the occlusion value, determine a bias value to be applied to the neural network operation based on the occlusion value and the weight, and obtain output data for input data using the neural network operation.

Advantageous Effects

According to embodiments disclosed in the disclosure, the CNN training result may be stored using a small memory space.

According to embodiments disclosed in the disclosure, the image processing result may be obtained quickly and rapidly using the CNN training result obtained according to various situations.

In addition, various effects directly or indirectly ascertained through the disclosure may be provided.

MODE FOR INVENTION

Figure 1:
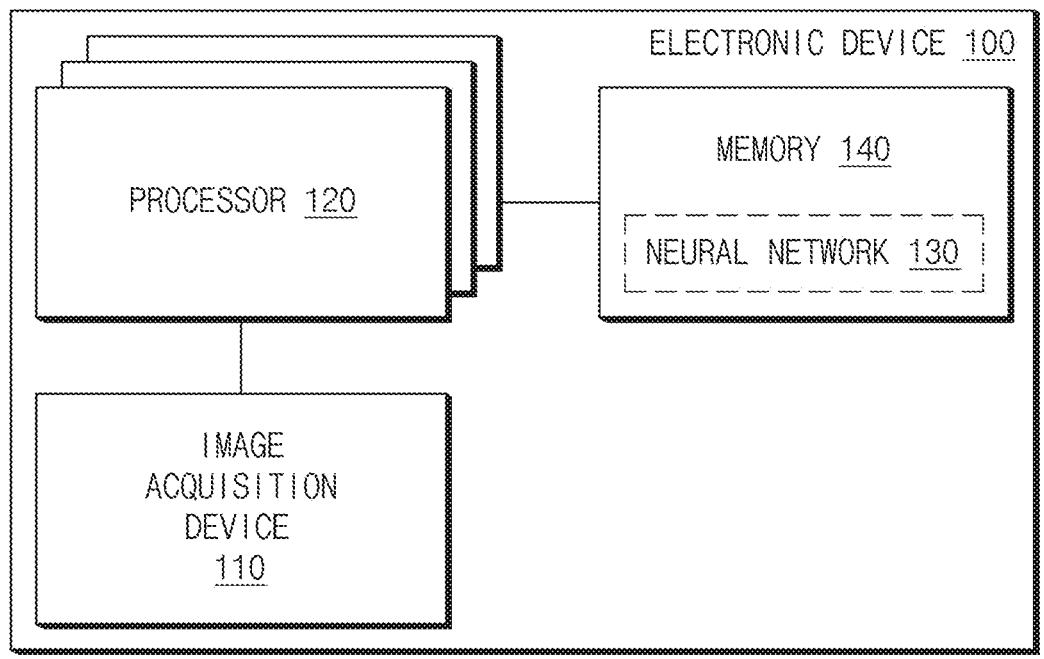
FIG. 1 is a block diagram illustrating a configuration of an electronic device according to an embodiment of the disclosure.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a block diagram illustrating a configuration of an electronic device according to an embodiment of the disclosure.

Referring to FIG. 1, an electronic device 100 in an embodiment of the disclosure may include an image acquisition device 110, at least one processor 120, and a memory 140. The configuration of the electronic device 100 shown in FIG. 1 is illustrative, and various modifications capable of implementing various embodiments disclosed in the disclosure are possible. For example, the electronic device 100 may include the same configuration as an electronic device 200 shown in FIG. 2, or may be suitably modified using the components. Hereinafter, various embodiments of the disclosure will be described with respect to the electronic device 100.

The image acquisition device 110 may obtain an image for performing neural network training or a neural network operation. The image may refer to a target, such as a picture, photo, or text, the electronic device 100 should recognize. The image acquisition device 110 may obtain the image and may convert the obtained image into input data recognizable by the electronic device 100. The image acquisition device 110 may obtain the input data itself. The image acquisition device 110 may deliver the obtained input data to the processor 120. In some cases, the input data may be training data to be trained. In some cases, the input data may be test data for performing a neural network operation based on the training result.

The processor 120 may execute calculation or data processing about control and/or communication of at least one other component. The processor 120 may receive the input data from the image acquisition device 110 and may process the input data. The processor 120 may obtain the result of neural network training for the input data using a neural network model 130 stored in the memory 140. The processor 120 may perform neural network processing for the input data using the neural network model 130 stored in the memory 140 to obtain output data. The processor 120 may use the neural network training result stored in the memory 140 to perform neural network processing.

The processor 120 may include one or more of a central processing unit (CPU), a graphic processing unit (GPU), an application processor (AP), or a communication processor (CP).

The memory 140 may store the neural network model 130. The memory 140 may store the output data. The output data may be a neural network operation result or a neural network test result. The memory 140 may store a neural network training result. The neural network training result may be obtained by the electronic device 100 and may be obtained from an external device. The neural network training result may include a weight and a bias value.

The respective components, the image acquisition device 110, the processor 120, and/or the memory 140, may be connected by a bus. The bus may include, for example, a circuit which connects the components and delivers communication (e.g., a control message and/or data) between the components.

Figure 2:
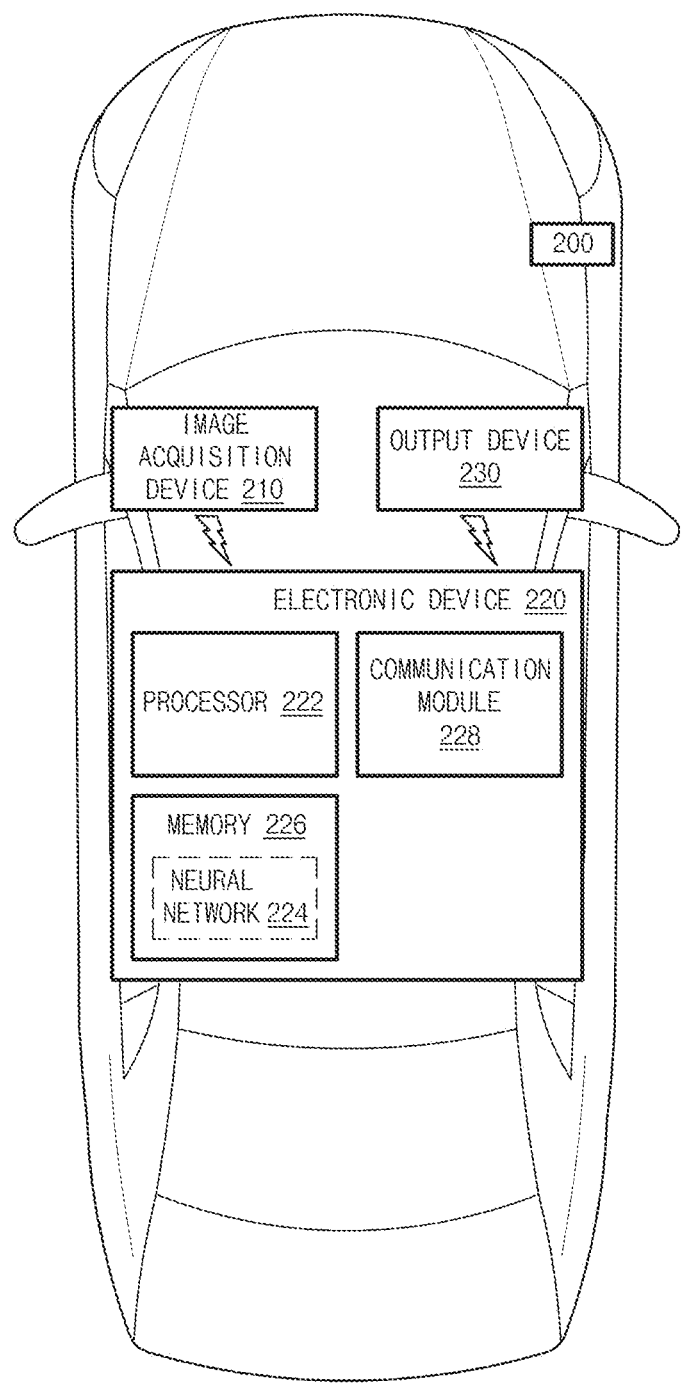
FIG. 2 illustrates an electronic device and a system environment of the electronic device according to another embodiment of the disclosure.

FIG. 2 illustrates an electronic device 220 and a system environment of the electronic device 220 according to another embodiment of the disclosure. The electronic device 220 of the disclosure is applicable to several devices or systems necessary for image recognition. As a representative example, there is an autonomous car, a drone, a robot, or the like. In FIG. 2, an embodiment of combining the electronic device 220 of the disclosure with other electronic devices will be described with respect to an autonomous driving system 200 applied to an autonomous car.

Referring to FIG. 2, the autonomous driving system 200 may include an image acquisition device 210, an electronic device 220, and an output device 230.

The electronic device 220 may include all or a portion of an electronic device 100 shown in FIG. 1. The electronic device 220 may include a processor 222, a memory 226 storing a neural network model 224, and a communication module 228. The electronic device 220 may be added or embedded in an autonomous car.

Because the processor 222 and the memory 226 are duplicated by a processor 120 and a memory 140 of FIG. 2, respectively, the description thereof will be omitted. The communication module 228 may perform communication with an external device (e.g., the image acquisition device 210 and an output device 230) over wireless communication or wired communication.

The image acquisition device 210 may obtain an image around the autonomous car. For example, the image acquisition device 210 may capture a sign around the autonomous car and may convert an analog signal into a digital signal. The image acquisition device 210 may transmit the digital signal to an external device (e.g., the electronic device 200). The image acquisition device 210 may include a 3-dimension (3D) camera, a digital camera, a video camera, a thermal camera, a night-vision camera, an infrared camera, an X-ray camera, a sensor, or a combination thereof. The image acquisition device 210 may include an analog-to-digital (A/D) converter capable of converting an input image into a digital signal. The image acquisition device 210 may further include a communication module to transmit an obtained input to the external device (e.g., the electronic device 220).

The output device 230 may perform an operation according to data or a command from the electronic device 200. For example, the output device 230 may include components capable of performing an operation of the autonomous car. The output device 230 may include, for example, a light, an alarm device, and/or a brake device.

Hereinafter, a description will be given of the electronic device 100 in embodiments of the disclosure.

Figure 3:
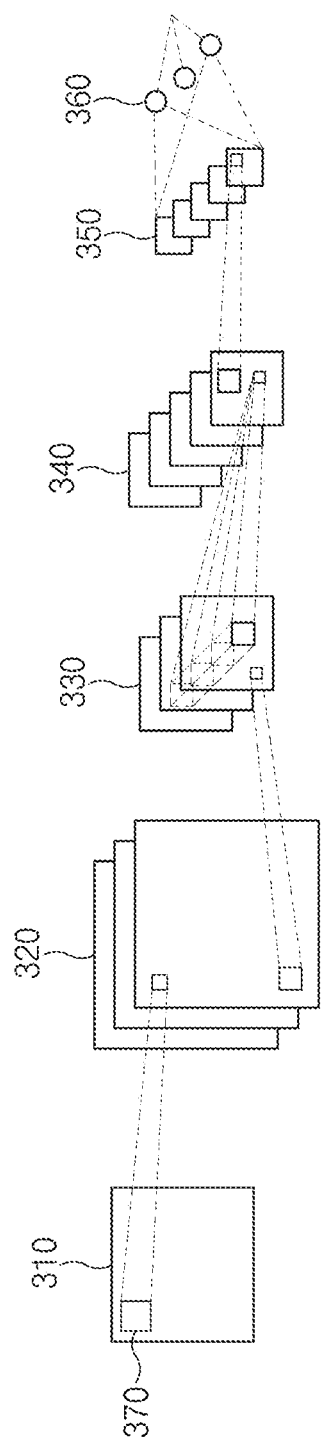
FIG. 3 illustrates a structure of a neural network applicable to the disclosure.

FIG. 3 illustrates a structure of a neural network applicable to the disclosure.

Neural network training using a neural network structure is to optimize characteristics (e.g., a weight, a bias, or the like) of respective neurons in the direction of minimizing a cost function of the entire neural network using vast amounts of training data. The neural network training may be performed through a feed-forward process and a back-propagation process. An electronic device 100 may compute an input and output of each of all neurons to the last output layer stage by stage through the feed-forward process. The electronic device 100 may compute an error on the final output layer stage by stage using the backpropagation process. The electronic device 100 may estimate characteristics of each hidden layer using the computed error values. That is, the neural network training may be an operation for obtaining an optimal parameter (e.g., a weight, a bias, or the like) using the feed-forward process and the backpropagation process.

Referring to FIG. 3, a convolutional neural network may include a plurality of layers. For example, the convolutional neural network may include an input layer 310, at least one convolution layer 320 and 340, at least one pooling layer 330 and 350, and a fully-connected layer 360. There may be the plurality of fully-connected layer 360. The final fully-connected layer 360 may be referred to as the output layer 360. Layers except for the input layer 310 and the output layer 360 may be referred to as hidden layers.

The convolution layers 320 and 340 may be a set of result values obtained by performing a convolution operation of neuron values of a previous layer. Referring to FIG. 3, neurons in a local receptive field of the input layer 310 may be connected to one neuron of a first convolution layer. A constant region of the input layer 310 may be masked with a filter 370 and may be connected to one neuron. A convolution operation value of a local receptive field corresponding to the filter 370 and the filter 370 may be a value of one neuron of the convolution layer 320. Output values of the filter 370 may configure a plurality of feature maps of the convolution layer 320. In FIG. 3, the number of feature maps of the convolution layer 320 may be three. The second convolution layer 340 may be composed of values in which the filter is applied to the pooling layer 330.

The pooling layers 330 and 350 may simplify output information of the convolution layers 320 and 340. A kernel is applicable to the pooling layers 330 and 350. The kernel may extract a specific value from a neuron in a constant area. An example of pooling for simplifying information is maximal pooling. In this case, the kernel may extract a maximum value from neurons in the constant area. The convolution layer 320 and the pooling layer 340 may perform feature extraction. The feature extraction corresponds to a process of extracting feature values capable of well representing data.

The fully-connected layer 360 is a layer, all neurons of which are connected with a previous layer. The fully-connected layer 360 may play a role as a classifier. Classifying is a process of computing a result depending on each feature value.

Figure 4:
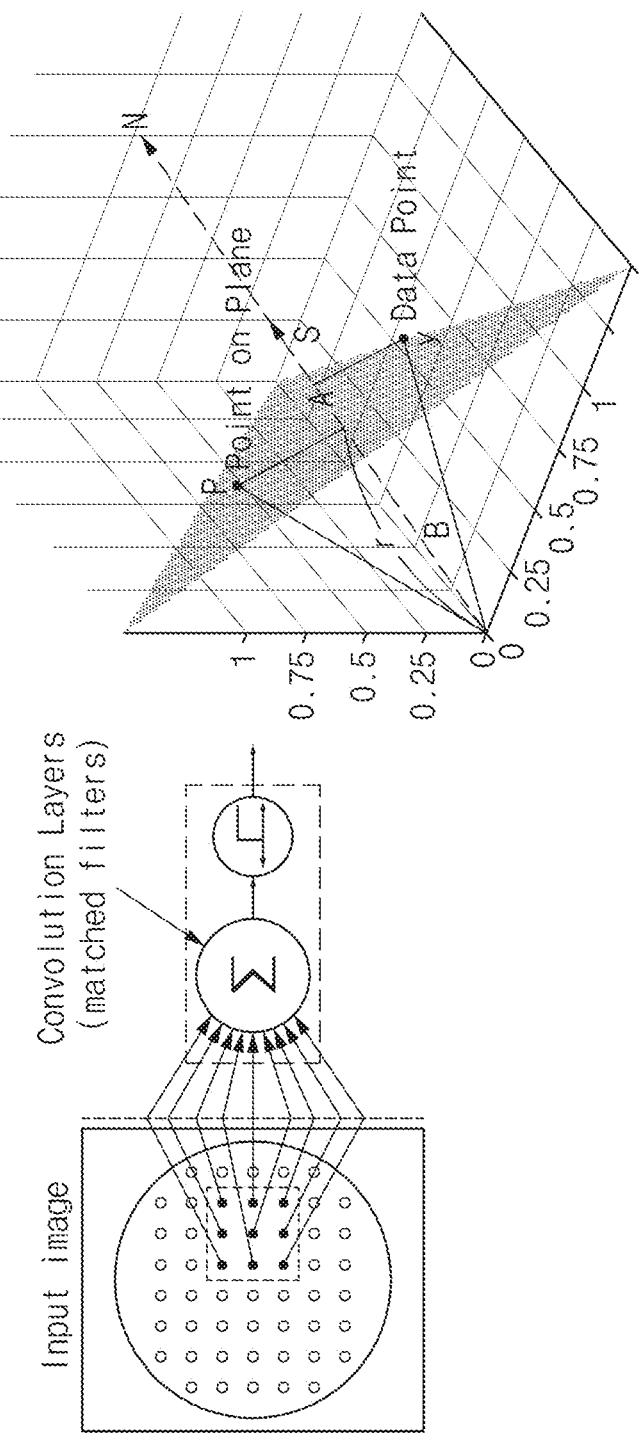
FIG. 4 illustrates a method for calculating the result of input data.

FIG. 4 is a drawing illustrating a method for computing the result of input data, using the learning result.

An output of neurons of each layer may be a result value of an activation function. For example, a sigmoid function, a hyperbolic tangent function, or a softmax function may be used as the activation function. FIG. 4 illustrates a case where a step function is used as the activation function.

Referring to FIG. 4, when the result of a convolution operation to which a weight and a bias are applied is greater than 0, an output value may be 1 depending on the application of the activation function. When the result of the convolution operation is not greater than 0, the output value may be 0. A significant feature may be extracted by the activation function.

When the significant feature is extracted by an operation on convolution layers 320 and 340 and pooling layers 330 and 350, a recognition or classification operation for the corresponding feature may be performed on a fully-connected layer 360.

Output results of the activation function may be represented on an n-dimensional space and may be classified by a hyperplane. The hyperplane corresponds to a shaded area shown in FIG. 4. When a specific output value is above the hyperplane, the corresponding output value may be output. On the other hands, when the specific output value is below the hyperplane, the corresponding output may fail to be output.

Referring to FIG. 4, a weight vector S={w0, w1, w2, w3, w4, w5, . . . , w8} may correspond to normal vector N of the hyperplane. A vector from the origin to input data may be referred to as y. An inner-product value of weight vector S and input data y may be referred to as <S, y>. <S, y> may correspond to a convolution operation value between a weight and input data. When <S, y> is greater than or equal to r, an output value is classified as 1 and is located above the hyperplane. Herein, r corresponds to a distance from the origin to the hyperplane. When <S, r> is less than r, data is classified as 0 and is located below the hyperplane. To put it another way, when <S, r>−r is greater than or equal to 0, the output value may be classified as 1. When <S, r>−r is less than 0, the output value may be classified as 0.

To enhance an image recognition rate, it may be important to set the hyperplane well. When there is noise in input data, although the same hyperplane is used, the rate of recognizing a neural network is reduced due to the noise. When noise occurs, the rate of detecting an object may be increased by changing a location of the hyperplane which plays a role in classifying data.

Distance r from the origin to the hyperplane is associated with bias wβ (or a weight of the bias) applied to a convolution operation. In an embodiment of the disclosure, the location of the hyperplane may be changed by adjusting bias wβ. wβ may correspond to an inner-product value <P, N> of vector P from the origin to a point on the hyperplane and weight vector N. The distance from the origin to the hyperplane corresponds to ‖B‖.

In an embodiment of the disclose, an electronic device 100 may perform training while fixing a weight and changing only a bias, with respect to different noise levels or an occlusion level indicating a degree of occlusion. In an embodiment of the disclosure, the electronic device 100 may determine only a bias depending on the noise level or the occlusion level and may output output data by means of a neural network operation.

Meanwhile, the aim of the neural network training is to obtain an optimal weight and bias based on gradient-descent. The optimal weight and bias may be a weight and bias for allowing the cost function to have the smallest value. The electronic device 100 may sequentially update a weight and a bias value using a partial differential value for the cost function in the direction of an input layer from an output layer using the cost function and the gradient-descent. Such a process is called the backpropagation process.

In embodiments of the disclosure, the electronic device 100 may train both of a weight and a bias value depending on the occlusion level and may train only the bias value for the weight while fixing the weight. The occlusion level may be a value indicating a degree of occlusion for an image. In the disclosure, the occlusion level may be interchangeably used with the noise level.

Figure 5:
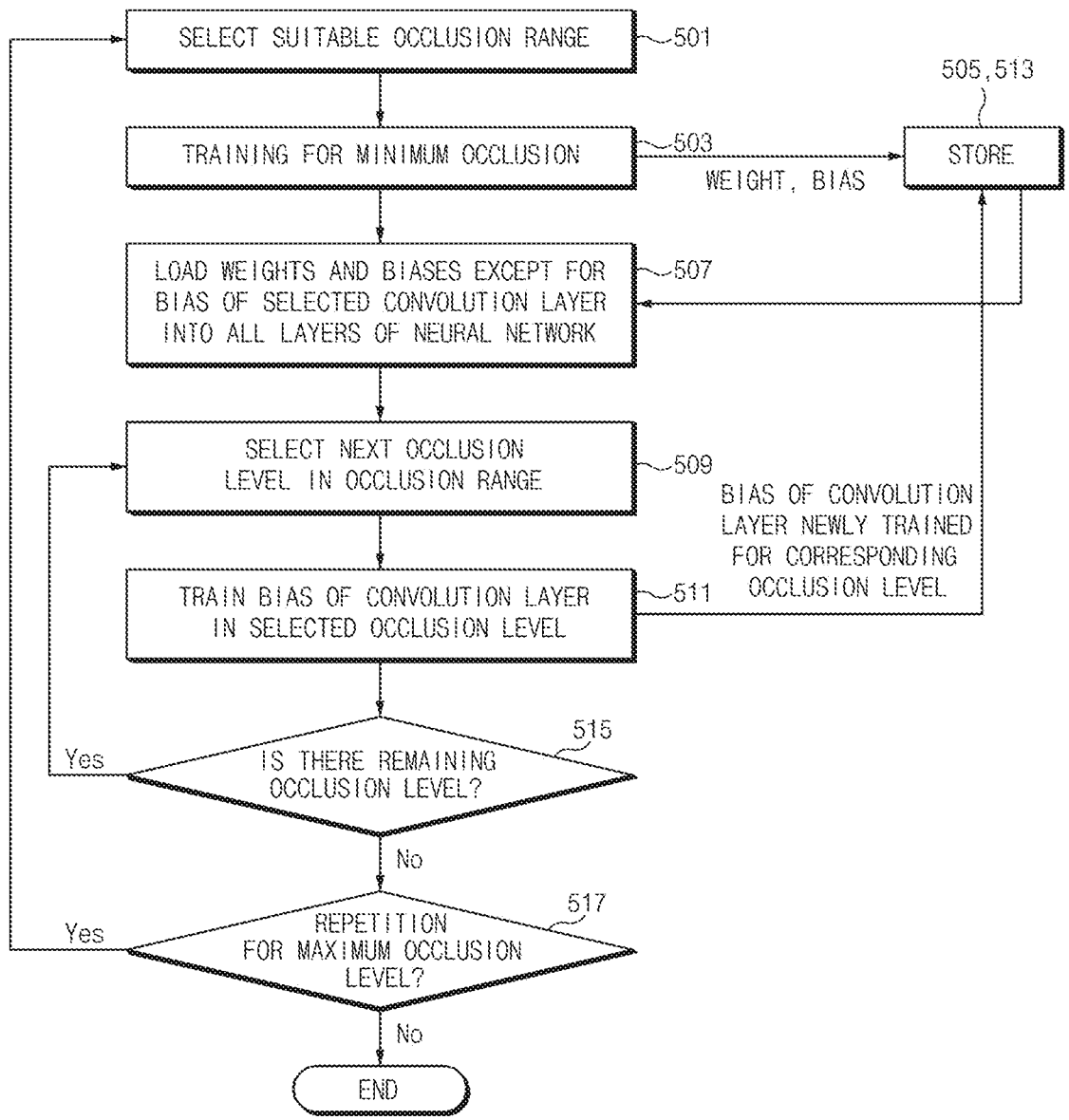
FIG. 5 illustrates a method for obtaining training data, as an embodiment of the disclosure.

FIG. 5 illustrates a method for obtaining training data, as an embodiment of the disclosure. A description will be given of a method for fixing a weight and adjusting a bias for each occlusion level. In a description below, the bias may be a bias value or a bias set. In the description below, an electronic device is described on the basis of an electronic device 100 of FIG. 1.

Referring to FIG. 5, in operation 501, the electronic device 100 may select a suitable occlusion range. In operation 501, the electronic device 100 may determine a step size of an occlusion level. The occlusion level may indicate a degree of occlusion. For example, the electronic device 100 may classify the occlusion level depending on rainfall. The step size of the occlusion level may be determined according to rainfall. For example, the lowest level may be a value corresponding to that there is no rain. The electronic device 100 may set rainfall of 0-10 mm per hour to level 1 and may set rainfall of 10-20 mm per hour to level 2. Alternatively, the electronic device 100 may set rainfall of 10 mm per hour to level 1 and may set rainfall of 20 mm per hour to level 2. The electronic device 100 may set a noise level. For example, the noise level may be set in the range of day to night on a clear day. In the description below, an embodiment of adjusting a bias on the basis of the occlusion level will be described. However, an embodiment is suitably modified for the noise level rather than the occlusion level.

In operation 503, the electronic device 100 may perform neural network training for the first level. In an embodiment, the first level may correspond to a minimum occlusion level. As a result of performing the neural network training, the electronic device 100 may obtain a weight and/or a bias for the minimum occlusion level. In connection with operations 503 and 517, training for a maximum occlusion level (e.g., a fifth level) may first be performed. When operation 503 is performed for the minimum occlusion level, in operation 517, operations below may be performed for the maximum occlusion level. When operation 503 is performed for the maximum occlusion level, in operation 517, operations below may be performed for the minimum occlusion level. Hereinafter, an operation of the disclosure will be described on the basis of the minimum occlusion level.

In operation 505, the electronic device 100 may store the trained weight and bias. The electronic device 100 may store the weight and bias for the minimum occlusion level. The electronic device 100 may store the weight and bias for the maximum occlusion level.

In operation 507, the electronic device 100 may load the other weights and biases except or a bias of a specific convolution layer into all layers of a neural network. The other weights may include a weight for the specific convolution layer.

In operation 509, the electronic device 100 may select a next occlusion level within the occlusion range. For example, a next occlusion level (e.g., level 1) of the minimum occlusion level (e.g., level 0) may be selected.

In operation 511, the electronic device 100 may train a bias of a convolution layer for the selected occlusion level. The electronic device 100 may train the bias for the corresponding convolution layer such that an error of an output value becomes small. In this case, the electronic device 100 may use the weight in operation 507. The electronic device 100 may perform operation 511 for all convolution layers.

In operation 513, the electronic device 100 may store a bias of a convolution layer newly trained for the selected occlusion level.

In operation 515, the electronic device 100 may determine whether there is a remaining occlusion level within the range of the occlusion level. When there is the remaining occlusion level, the electronic device 100 may repeat the operation from operation 509.

When there is no remaining occlusion level, in operation 517, the electronic device 100 may determine whether it is necessary for repetition of the maximum occlusion level. When it is necessary for an operation of training a bias value with respect to the maximum occlusion level, the electronic device 100 may repeat the operation from operation 503. When it is unnecessary for the operation of training the bias value with respect to the maximum occlusion level, the training may be ended.

According to the operations in FIG. 5, the electronic device 100 may store the weight and the bias for the minimum occlusion level. The electronic device 100 may store a bias adjusted for each level, with respect to the weight for the minimum occlusion level. The electronic device 100 may store the weight and the bias for the maximum occlusion level. The electronic device 100 may store a bias adjusted for each level, with respect to the weight for the maximum occlusion level.

Figure 6:
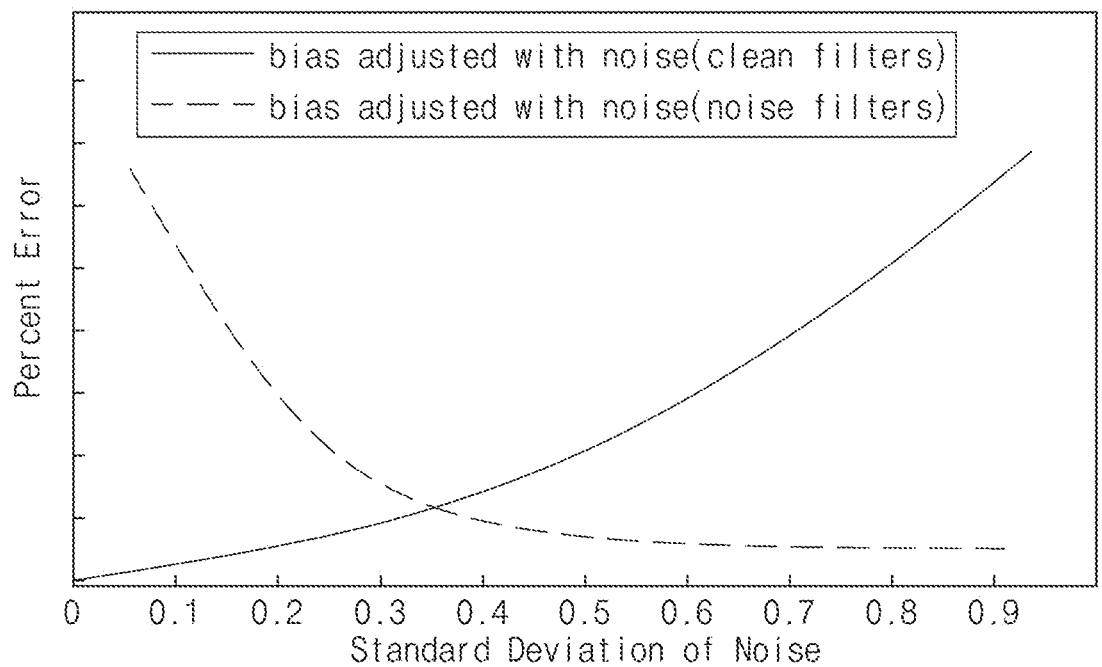
FIG. 6 is a graph illustrating a percent error according to a standard deviation of noise.

FIG. 6 is a graph illustrating a percent error according to a standard deviation of noise.

A solid line and a dotted line in FIG. 6 indicate a percent error calculated based on a target value and a test value. A high error value means that the result of a neural network operation is incorrect.

The solid line in FIG. 6 indicates an error when using the training result of adjusting a bias depending on a standard deviation of noise with respect to a weight for the lowest occlusion level. In this case, the filter used for each experiment may be referred to as a clean filter. The filter corresponds to a weight and a bias value. The clean filter may refer to a filter to which a weight for the lowest occlusion level is applied.

Referring to FIG. 6, as a result of using the clean filter, a difference of an error between standard deviations of noise is not high with respect a low standard deviation of noise. In a point with a low standard deviation of noise, the error shows a significantly low value. On the other hand, as the standard deviation of noise is larger, the error becomes higher and higher. Particularly, the error becomes larger than an error indicated by the dotted line from the moment that it passes through a point intersecting the dotted line.

The dotted line in FIG. 6 indicates an error when using the training result of adjusting a bias value with respect to a weight for the maximum occlusion level. In this case, the filter used for the experiment may be referred to as a noisy filter. The noisy filter may be a filter to which a weight for the maximum occlusion level is applied.

Referring to FIG. 6, as a result of adjusting the bias on the basis of the weight for the maximum occlusion level, a difference of an error between standard deviations of noise is not large with respect to a high standard deviation of noise. The error in the high standard deviation of noise shows a significantly low value and has a value lower than the error indicated by the solid line. On the other hand, as the standard deviation of noise is smaller, the error becomes higher and higher. Particularly, an error corresponding to the dotted line becomes higher than the error indicated by the solid line from the moment that it passes through a point intersecting the solid line.

According to the above-mentioned simulation result, although the same weight is used for constant occlusion levels, a relatively accurate image recognition result may be obtained. That is, an accurate image recognition result may be obtained using a training result according to operations of FIG. 5. Two weights may be used according to the result of FIG. 6, but more weights may be used according to an error characteristic.

In embodiments of the disclosure, an electronic device 100 may train a bias for each occlusion level and may use the trained value. In embodiments of the disclosure, the electronic device 100 may classify and store weights and biases with reference to the simulation result such as FIG. 6 and may use the stored values.

Figure 7:
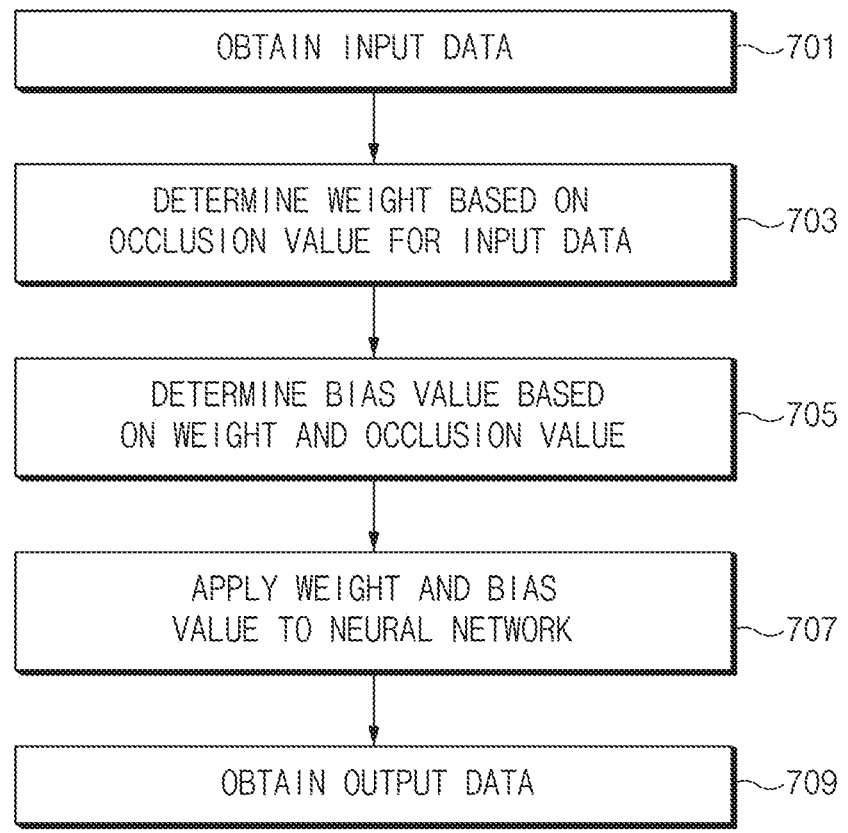
FIG. 7 is a flowchart of a method for performing a neural network operation depending on an occlusion value, according to another embodiment of the disclosure.

FIG. 7 is a flowchart of a method for performing a neural network operation depending on an occlusion value, according to another embodiment of the disclosure. A description will be given of a method for determining a parameter to be applied to a neural network operation according to an occlusion value with reference to FIG. 7. Herein, the parameter may be referred to as a weight and/or a bias value.

In the description of FIG. 7, it may be assumed that the training result of training a bias for each occlusion level for a specific weight is stored. The specific weight may be, for example, a weight for the lowest occlusion level, a weight for a middle occlusion level within a constant range, and/or a weight for the highest occlusion level.

In operation 701, an electronic device 100 may obtain input data. The electronic device 100 may obtain the input data by means of an image acquisition device 110 or may obtain the input data through an external device as shown in FIG. 2.

In operation 703, the electronic device 100 may determine a weight based on an occlusion value for the input data. In an embodiment, the electronic device 100 may compare the occlusion value with a specific threshold. For example, in FIG. 6, the threshold may be an occlusion level (e.g., level 3) corresponding to a standard deviation of noise of 0.3 to 0.4. When the obtained occlusion value is less than level 3, the electronic device 100 may select a weight corresponding to the minimum occlusion level. When the obtained occlusion value is greater than level 3, the electronic device 100 may select a weight corresponding to the maximum occlusion level.

In operation 705, the electronic device 100 may determine a bias value to be applied to a neural network operation based on the determined weight and the occlusion value. Herein, the bias value may be a specific value among bias values trained for each occlusion level with respect to the determined weight.

Hereinafter, a description will be given of an embodiment for determining a bias value assuming that the occlusion level is 2.5 between 2 and 3. In an embodiment, the electronic device 100 may select a bias value previously obtained for occlusion level 2. The previously obtained bias value may be a bias value obtained according to an operation of FIG. 5. In another embodiment, the electronic device 100 may determine a bias value by applying an interpolation to occlusion level 2 and occlusion level 3. To determine the bias value, various methods other than the above-mentioned embodiment may be applied.

In operation 707, the electronic device 100 may apply the determined weight and bias value to a neural network operation. In an embodiment, the electronic device 100 may apply the determined weight and bias value to a convolution operation.

In operation 709, the electronic device 100 may obtain output data based on the neural network operation. The output data may include the result of recognizing the input data (e.g., right turn indication) and/or a control command based on the recognized result.

Figure 8:
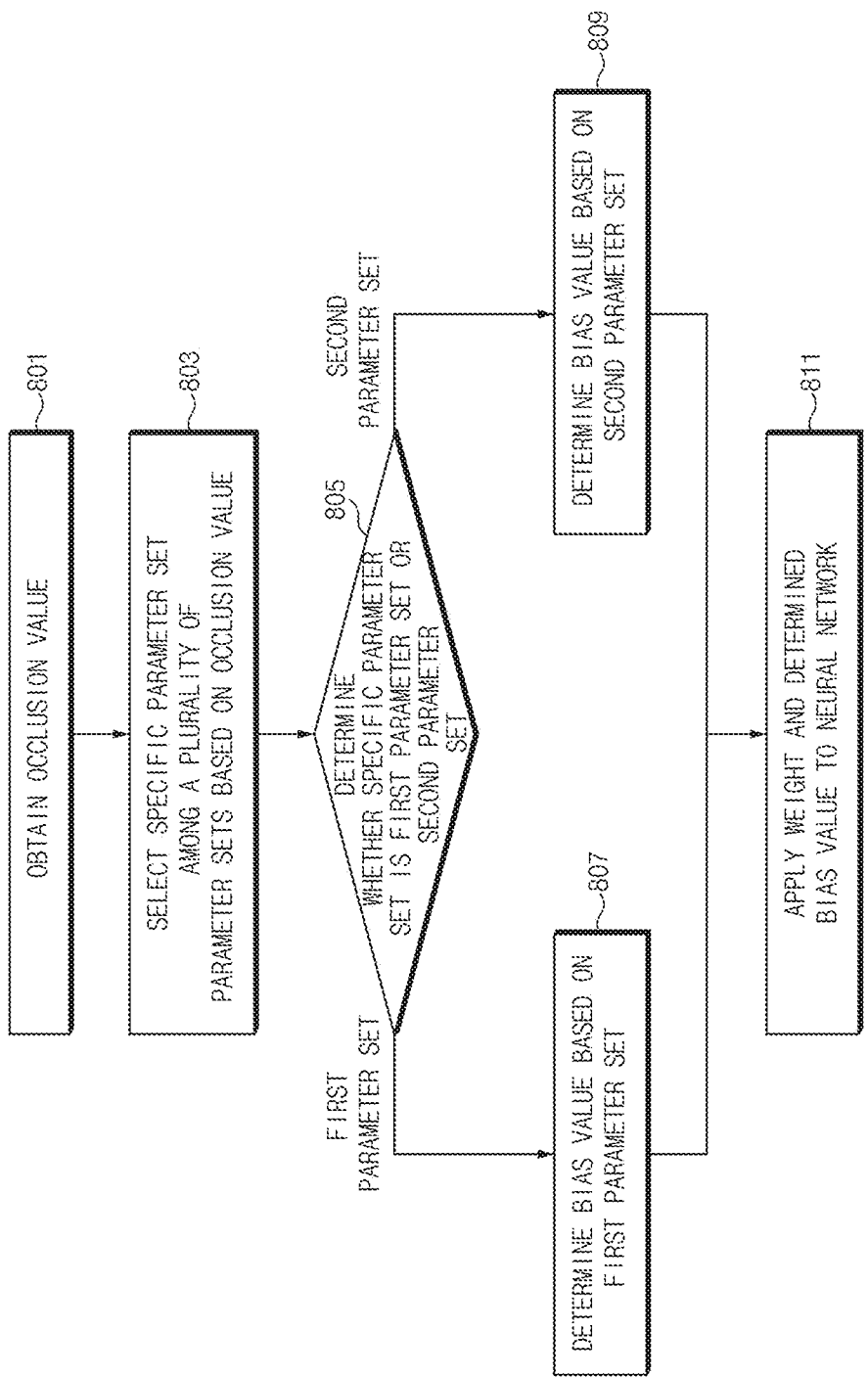
FIG. 8 is a flowchart of a method for performing a neural network operation depending on an occlusion value, according to another embodiment of the disclosure.

FIG. 8 is a flowchart of a method for performing a neural network operation depending on an occlusion value, according to another embodiment of the disclosure.

In FIG. 8, it is assumed that an electronic device 100 stores a plurality of parameter sets based on the result of training. One parameter set may be a set of bias values corresponding to one weight. The one parameter set may include a weight optimized for a specific occlusion level. The one parameter set may include a bias value obtained for a plurality of levels with respect to the optimized weight. The one parameter set may further include a hyper-parameter used to determine the weight and bias.

In operation 801, the electronic device 100 may obtain an occlusion value associated with input data. For example, describing rainfall, an occlusion level may be set such that a difference occurs by 1 every 500 mm/h. When it rains about 50 mm at a specific time, the electronic device 100 may obtain occlusion level 1 as an occlusion value. When it rains about 25 mm at a specific time, the electronic device 100 may obtain an occlusion value corresponding to it. The obtained occlusion value may correspond to a value between occlusion level 1 or 2.

In operation 803, the electronic device 100 may select a specific parameter among the plurality of parameter sets based on the occlusion value. In FIG. 8, an embodiment is exemplified as the plurality of parameter sets include a first parameter set and a second parameter set. However, the plurality of parameters may include more parameter sets.

In operation 805, the electronic device 100 may determine whether the specific parameter set is the first parameter set or the second parameter set. When the specific parameter set is the first parameter set, in operation 807, the electronic device 100 may determine a bias value based on the first parameter set. When the specific parameter set is the second parameter set, in operation 809, the electronic device 100 may determine a bias value based on the second parameter set.

In operation 811, the electronic device 100 may apply the weight and the bias value determined in operation 807 or 809 to a neural network operation. Herein, the determined weight may be a value corresponding to the first parameter set or the second parameter set. When the first parameter set is selected in operations 803 and 805, the electronic device 100 may use the weight corresponding to the first parameter set.

Figure 9:
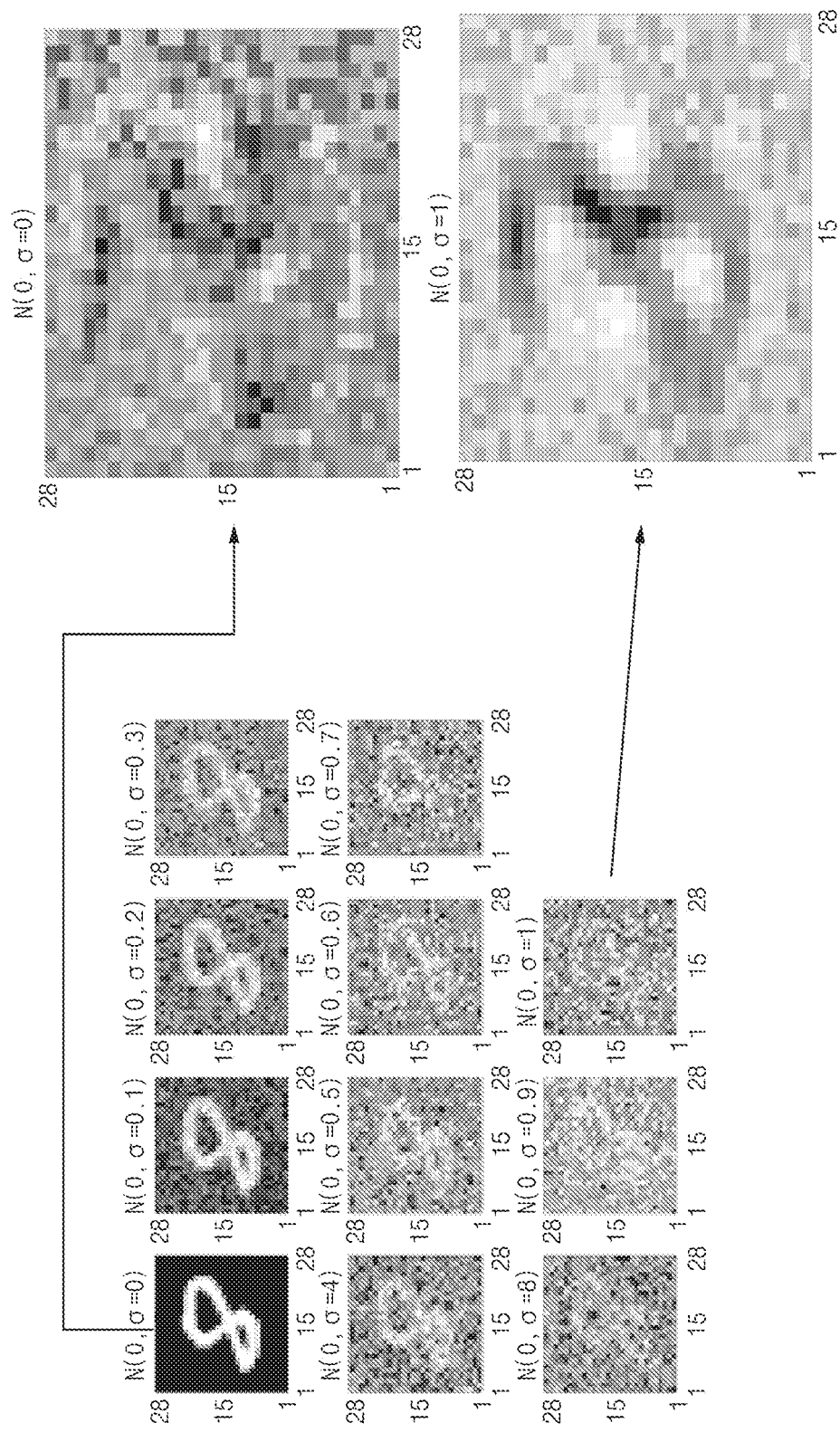
FIG. 9 illustrates image data to which additive white Gaussian noise is added and the result of a neural network operation.

FIG. 9 illustrates image data to which additive white Gaussian noise is added and the result of a neural network operation.

FIG. 9 illustrates images in which additive white Gaussian noise (AWGN) having various probability variables is added to one image where number 8 is written. FIG. 9 illustrates that a neural network operation for noise of $\sigma=0$ is performed and that a neural network operation for noise of $\sigma=1$ is performed. In this case, it is assumed that the same filter is applied to a convolution layer (e.g., a filter in which a weight and a bias value are equal to each other). When the same filter as $\sigma=1$ is applied to a case where $\sigma=0$, it may be seen that it is more difficult to recognize that $\sigma=0$ than $\sigma=1$.

The filter is estimated from an image column in which there is noise arranged randomly. The estimated filter is not associated with a noise level theoretically, but is actually affected by the noise level as shown in FIG. 9. For a neural network operation to achieve a high recognition rate, a weight of a convolution layer of a neural network should be changed according to the noise level.

However, changing a weight in consideration of all noise requires a very high capacity memory. In connection with a size of the filter, as the filter is larger in size, an electronic device 100 should store more weights as the convolution layer is deeper in depth. Thus, according to embodiments of the disclosure, it is able to recognize an image accurately for each noise by training biases of various values rather than a weight for each noise level. Furthermore, it may prepare for various noise situations using a relatively low capacity memory.

Figure 10:
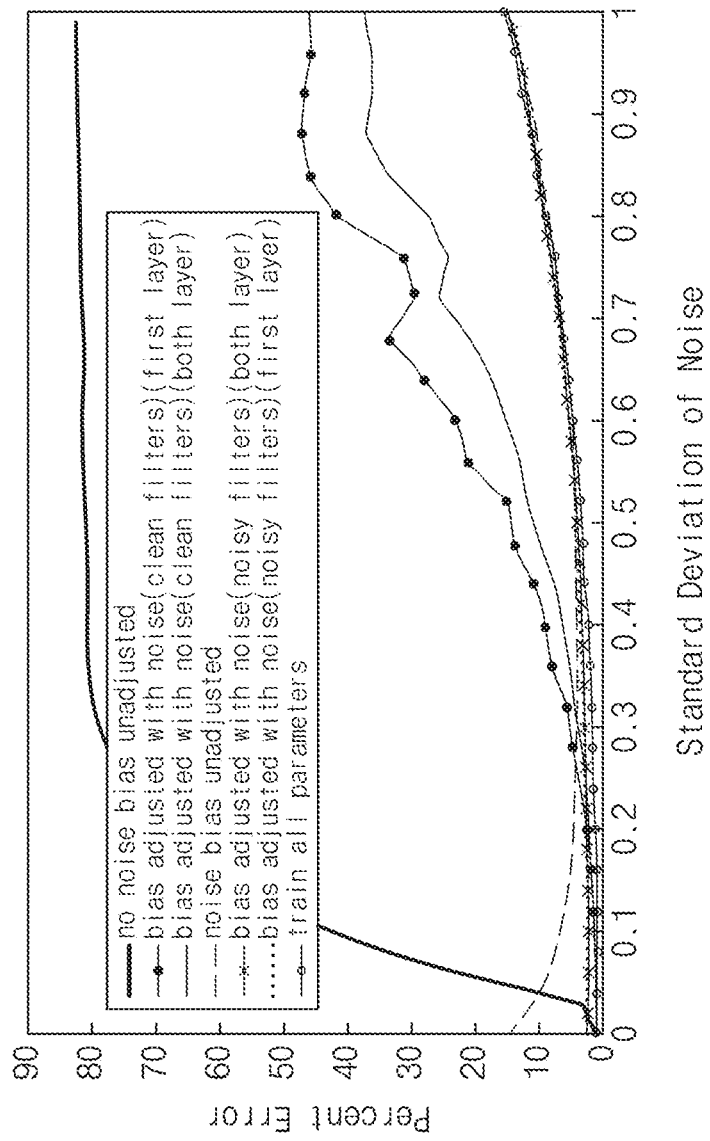
FIG. 10 is a graph illustrating a percent error according to noise using various neural network training data.

FIG. 10 is a graph illustrating a percent error according to noise using various neural network training data. Error simulation for test data may use various neural network training results. The neural network training results may include results when a bias is unadjusted, when a bias is adjusted with noise for a clean filter, when a bias is adjusted with noise for a noisy filter, and when all parameters are trained. The clean filter may refer to a filter having a weight obtained when a noise level is low. The noisy filter may refer to a filter having a weight obtained when the noise level is high.

Referring to FIG. 10, it may be seen that an error is increased greatly as noise increases when a bias value is not changed. When using the training result in which a bias value is adjusted for the clean filter, a very low error value is indicated for noise with a low standard deviation of noise. When using the training result in which a bias value is adjusted for the noisy filter, an overall low error is indicated. When using the result of training all parameters for all noise, an error of a little difference with when the bias value is adjusted for the noisy filter is indicated.

Referring to FIG. 10, it may be seen that adjusting the bias value shows an effect close to when all parameters are trained, irrespective of occupying low memory capacity.

Hereinafter, a description will be given of an embodiment of using the training result obtained by adjusting a bias according to the disclosure with reference to FIG. 11.

Figure 11:
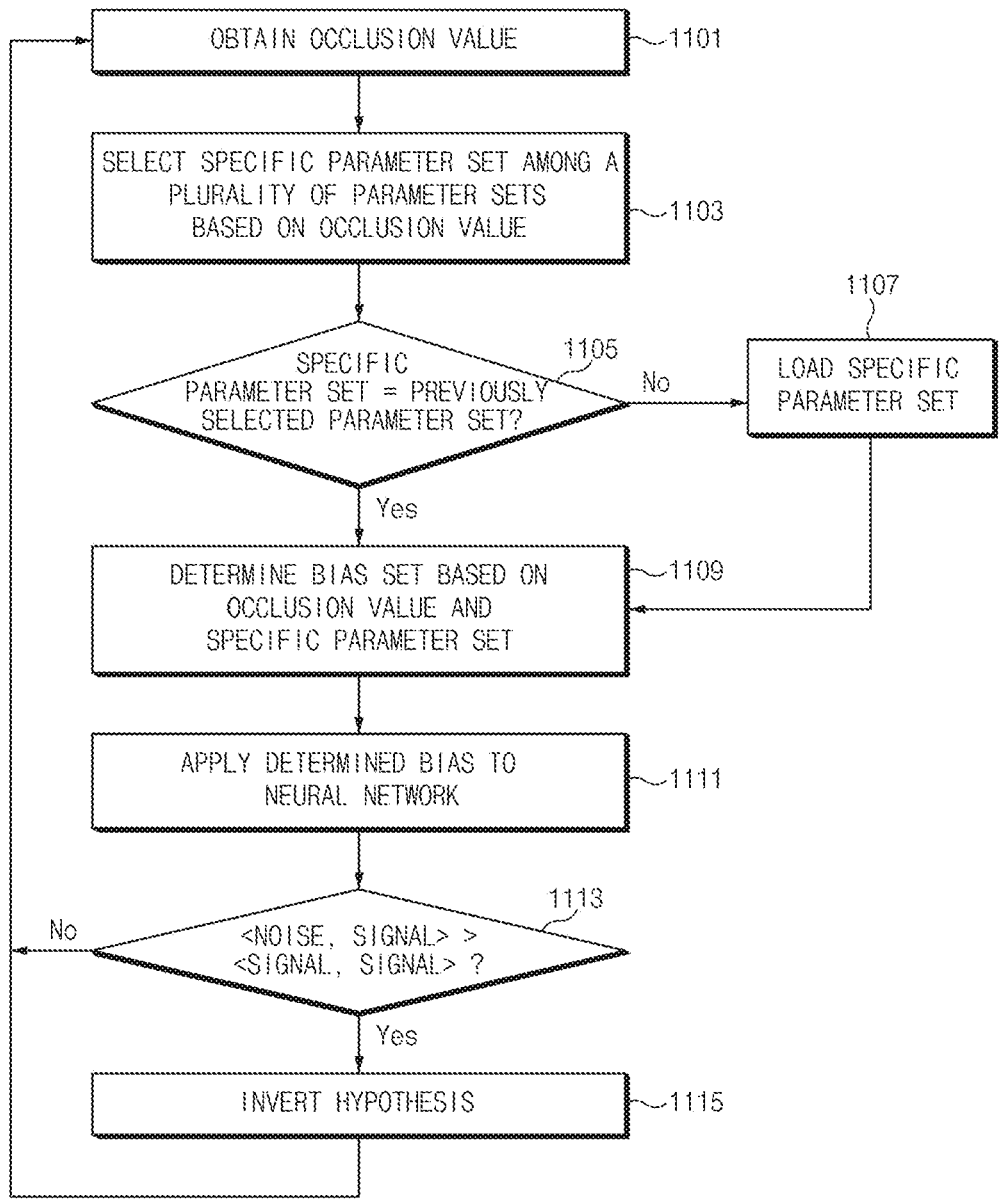
FIG. 11 is a flowchart of a method for performing a neural network operation based on an occlusion value, as another embodiment of the disclosure.

FIG. 11 is a flowchart of a method for performing a neural network operation based on an occlusion value, as another embodiment of the disclosure. In more detail, FIG. 11 illustrates a sequence of a method for determining a parameter set and a bias to be applied to a neural network operation depending on an occlusion value associated with input data. The determining of the parameter set may correspond to determining of a weight. One weight may be specified for each parameter set.

In FIG. 11, it is assumed that an electronic device 100 stores a plurality of parameter sets based on the result of training. One parameter set may be a bias set corresponding to one weight. The one parameter set may include a weight optimized for a specific occlusion level. The one parameter set may include a bias set obtained for a plurality of levels with respect to the optimized weight. The one parameter set may include a hyper-parameter used to determine the weight and bias.

The bias set may be a set of bias values applied to a convolution layer. The bias set may be a set of bias values applicable to each convolution layer. The bias set may be a set of bias values applicable for each filter applied to the convolution layer. The parameter set may include a plurality of bias sets. Each bias set may be a set of bias values obtained for each occlusion level by the electronic device 100. Each bias set may be specified or interwork for each occlusion level.

Herein, the occlusion level for the parameter set may be some or all of occlusion levels within a constant range. The occlusion level for the parameter set may be a value which has a constant interval stage by stage. In a description below, the trained occlusion level may be referred to as levels at which a parameter set trained for the corresponding level is stored.

Referring to FIG. 11, in operation 1101, the electronic device 100 may obtain an occlusion value. Because the description of the occlusion value is duplicated by the description of operation 701 in FIG. 7, the description thereof will be omitted.

In operation 1103, the electronic device 100 may select a specific parameter set among a plurality of parameter sets based on the obtained occlusion value. For example, the electronic device 100 may set a threshold for determining a parameter set and may select the specific parameter set based on the corresponding threshold. The electronic device 100 may previously specify a threshold to be used for each range of an occlusion level.

For another example, the electronic device 100 may specify a parameter set for each occlusion level. For example, the electronic device 100 may specify to use a first parameter set when the occlusion level is 1, 3, or 5 and use a second parameter set when the occlusion level is 2, 4, or 6.

Information about the selection of the specific parameter set may be specified by the electronic device 100 or may be received from a separate device.

In operation 1105, the electronic device 100 may determine whether the specific parameter set is a previously selected parameter set.

When the specific parameter set is not the previously selected parameter set, in operation 1107, the electronic device 100 may load the selected specific parameter set and may perform operation 1109.

When the specific parameter set is the previously selected parameter set, the electronic device 100 may use a parameter set which is already loaded. In operation 1109, the electronic device 100 may determine a specific bias set based on the occlusion value and the specific parameter set. The specific bias set may be a bias set for use in a neural network operation at the electronic device 100.

As an example of determining the bias, when the occlusion value is any one of the trained occlusion levels, the electronic device 100 may determine a bias set corresponding to the trained occlusion level as the specific bias set. The electronic device 100 may determine the specific bias set among bias sets in the specific parameter.

When the occlusion value does not correspond to the trained occlusion level, for example, the electronic device 100 may determine a bias set, obtained for a trained occlusion level which is closest to the occlusion value, as the specific bias set.

For another example, the electronic device 100 may determine the specific bias set by applying an interpolation to a bias set corresponding to a trained occlusion level around the occlusion value. For example, when the occlusion value is 1.5, the electronic device 100 may use occlusion level 1 and occlusion level 2.

The electronic device 100 may use the embodiments when the occlusion value is within the range of the occlusion level, but may perform the following operation when the occlusion value is out of the range of the occlusion level.

For example, the electronic device 100 may use the trained occlusion level which is closest to the occlusion value. For another example, the electronic device 100 may use an extrapolation using the learned occlusion level around the occlusion value to determine the specific bias set.

In operation 1111, the electronic device 100 may apply bias values of the specific bias set to a neural network. The electronic device 100 may apply the bias values to a convolution operation. The electronic device 100 may apply filters which respectively have the bias values.

In operation 1113, the electronic device 100 may determine a relationship between noise and a signal. <x, y> may be a correlation between x and y. The electronic device 100 may compare, for example, a <noise, signal> value which is an inner product value of noise and a signal with a <signal, signal> value which is an inner product value of a signal and a signal.

An input signal may be configured by adding a searching signal to noise. While seeing the input signal, a specific filter of each convolution layer may find a feature of the searching signal. The searching signals may be weights to specific filters of the convolution layer.

The specific filter of the convolution layer may be applied to <input signal, searching signal>. Herein, the input signal may be the sum of the searching signal and the noise, or when there is no searching signal, the input signal may include only the noise. Thus, <input, signal>=<signal+noise, signal>=<signal, signal>+<noise, signal>, or <input, signal> may be <noise, signal>.

The convolution layer may determine one of two hypotheses. The first hypothesis is a null hypothesis H0 and is when only noise is included in an input signal without a searching signal. The second hypothesis is an alternative hypothesis H1 and is when the input signal includes the searching signal. In this case, the input signal may be the sum of the searching signal and the noise.

The noise may be measured from the input signal or may be measured by means of another meter. The noise may be occlusion or may be associated with a size of occlusion. The signal may be weight energy for the specific filter of the convolution layer. The signal may be a searching signal for specific noise. The searching signal may correspond to values derived by a weight of a filter filtering the input signal. The searching signal may be a signal encoded by a weight (e.g., an aka filter) of a neuron of the convolution layer.

When a <noise, signal> value meets a specific condition in a relationship with a <signal, signal> value, in operation 1115, the electronic device 100 may invert a hypothesis. For example, the electronic device 100 may change the hypothesis from the null hypothesis to the alternative hypothesis. H0 may indicate that there is no searching signal or that it is associated with a searching signal, and H1 may indicate that there is a searching signal or that it is associated with the searching signal. The electronic device 100 may invert the hypothesis and may search for a minimum value rather than a minimum value of <signal, input>. For example, the electronic device 100 may search for the minimum <signal, input> value rather than searching for the maximum <signal, input> value. The specific condition may be when the <noise, signal> value is greater than the <signal, signal> value. Alternatively, the specific condition may be when the <noise, signal> value is greater than or equal to the <signal, signal> value.

In FIG. 11, when the <noise, signal> value is less than or equal to or less than a <signal, input> value or the <signal, signal> value, the procedure of FIG. 11 may be repeated without inverting the hypothesis. In this case, the electronic device 100 may output the recognized result.

Figure 12:
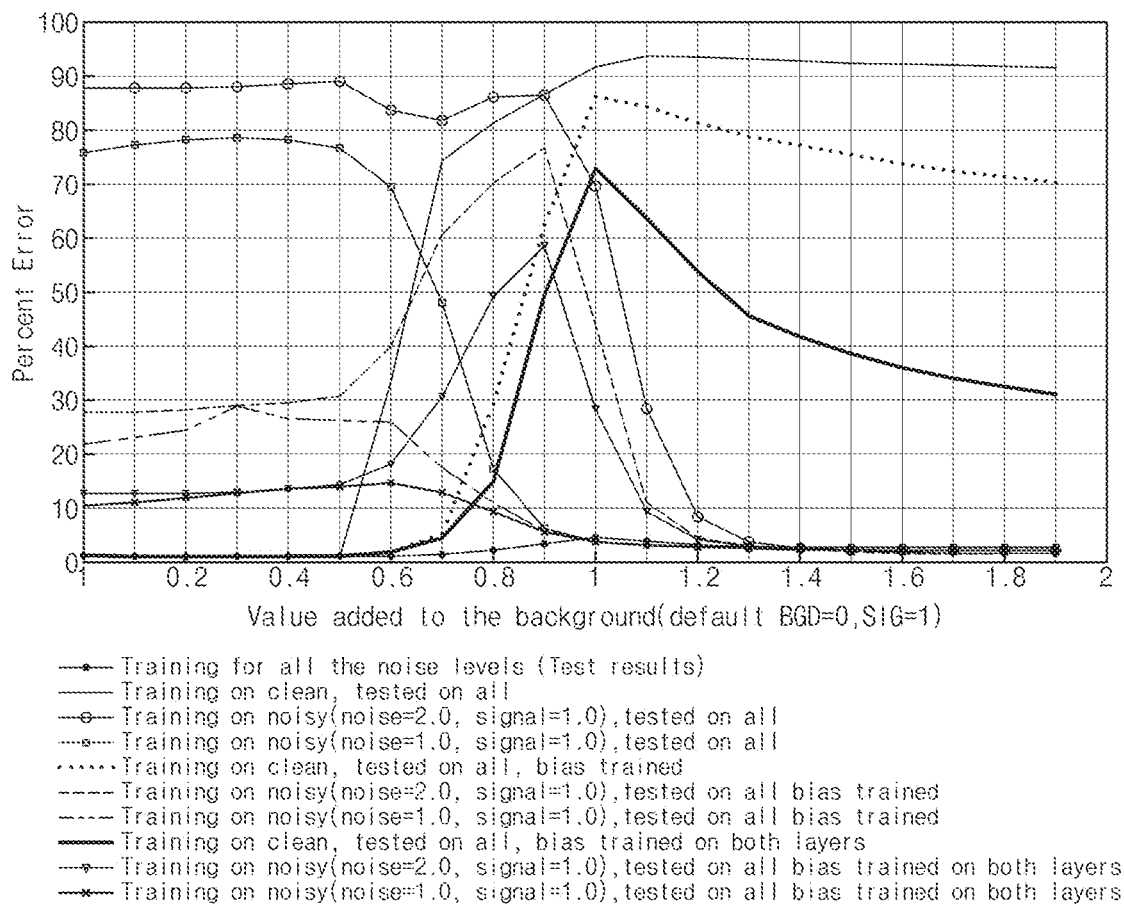
FIG. 12 is a graph illustrating a percent error according to noise using various neural network training data.

FIG. 12 is a graph illustrating a percent error according to noise using various neural network training data.

FIG. 12 illustrates that noise values having 0 to 255 is represented in the range of 0 to 2 on the image. Furthermore, some simulation results are performed by inverting the hypothesis at noise 1 depending on a correlation between a signal and noise.

Referring to FIG. 12, when a parameter is trained for all noise levels, the test result indicate a low error of less than 10% in the entire noise interval.

When a weight is trained on clean, the test result for a test input indicates a low error for low noise, whereas it indicates a high error for high noise.

When a bias is trained on clean, a relatively lower error is indicated than when the weight is trained on clean.

When the weight is trained on a high noise level (e.g., 2.0), a low error is indicated for high noise, whereas a high error is indicated for low noise. When the weight is trained on the same noise level as the signal, a relatively lower error is indicated than a high noise level.

When the bias is trained by applying the embodiment described with reference to FIG. 11 to the respective noise levels, the test result is enhanced significantly. The error is indicated as a considerably low value on the other noise levels except for the proximity of noise (1, 0) at which the hypothesis is inverted.

As such, after it is trained by applying an embodiment of the disclosure, when the image is recognized based on the neural network operation, a more accurate recognized result may be obtained than when using training for an existing weight.

Moreover, a lower error is indicated when training is performed for the two convolution layers than when training is performed for only one convolution layer. That is, many operations are required as convolution layers increases in number, whereas a relatively accurate recognized result may be obtained.

Each of the elements described in the disclosure may be configured with one or more components. A title of the corresponding element may vary with a type of the electronic device. In various embodiments, the electronic device may be configured to include at least one of the elements described in the disclosure, and may not include some elements or may further include another element. Furthermore, some of the elements of the electronic device according to various embodiments are combined to be configured as one entity, and may perform the functions of the corresponding elements, before being combined, in the same manner.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device for processing an image based on neural network training, the electronic device comprising:
a memory storing a plurality of parameter sets, each of which includes one weight and bias sets respectively corresponding to n (where n >1) occlusion levels among a plurality of occlusion levels within a certain range; and at least one processor configured to obtain output data by inp rtting input data to a neural network, wherein the at least one processor is configured to:
obtain an occlusion value and determine a specific parameter set among the plurality of parameter sets based on the occlusion value,
determine a specific bias set in the specific parameter set based on the occlusion value, and
obtain the output data using a weight corresponding to the specific parameter set and the specific bias set.

2. The electronic device of claim 1,
wherein the plurality of parameter sets include a first parameter set and a second parameter set, and
wherein the first parameter set includes a plurality of first bias sets obtained for each occlusion level with respect to a first weight and the second parameter set includes a plurality of second bias sets obtained for each occlusion level with respect to a second weight.

3. The electronic device of claim 2,
wherein the first weight is a value optimized for the neural network with respect to a minimum occlusion level in a range of the occlusion level, and
wherein the second weight is a value optimized for the neural network with respect to a maximum occlusion level in the range of the occlusion level.

4. The electronic device of claim 2, wherein the at least one processor is configured to:
select the first parameter set, when the occlusion value meets a specific value, and
select the second parameter set, when the occlusion value does not meet the specific value.

5. The electronic device of claim 1, wherein the at least one processor is configured to:
when one of the n occlusion levels is identical to the obtained occlusion value, determine the specific bias set as a bias set corresponding to the one of the n occlusion levels, and
when the n occlusion levels are not identical to the obtained occlusion value, determine the specific bias set based on two or more of the n occlusion levels.

6. The electronic device of claim 5, wherein the at least one processor is configured to:
determine the specific bias set based on an interpolation of bias sets corresponding to the two or more of the n occlusion levels.

7. The electronic device of claim 5, wherein the at least one processor is configured to:
determine the specific bias set based on an extrapolation of bias sets obtained for the two or more of the n occlusion levels.

8. The electronic device of claim 1, wherein the at least one processor is configured to:
determine a bias set, corresponding to an occlusion level which is shortest from the obtained occlusion value among occlusion levels in the specific parameter set, as the specific bias set.

9. The electronic device of claim 1, wherein the neural network is a convolutional neural network.

10. The electronic device of claim 1, wherein the at least one processor is configured to:
generate a feature map of a convolution layer based on a weight corresponding to the specific parameter set and the specific bias set.

11. The electronic device of claim 1, wherein each bias set corresponds to a distance from a hyperplane for recognizing the input data to the origin.

12. The electronic device of claim 1, wherein each bias set includes a bias value associated with each convolution layer.

13. The electronic device of claim 1, wherein each bias set includes a bias value associated with each feature map of a convolution layer.

14. The electronic device of claim 1, wherein the at least one processor includes a graphic processing unit (GPU).

15. An electronic device for processing an image based on neural network training, the electronic device comprising:
a memory storing a first parameter set and a second parameter set, each of which includes one weight and bias values respectively corresponding to n (where, n >1) occlusion levels among a plurality of occlusion levels within a certain range; and
at least one processor configured to obtain output data by inputting input data to a neural network,
wherein the at least one processor is configured to:
obtain an occlusion value and determine a parameter set to be applied to the neural network as the first parameter set based on the occlusion value,
determine a specific bias value in the first parameter set based on the occlusion value, and
obtain the output data using a weight corresponding to the first parameter set and the specific bias value.

* * * * *